(12) United States Patent
Carr et al.

(10) Patent No.: US 7,903,398 B2
(45) Date of Patent: Mar. 8, 2011

(54) INFORMATION HANDLING SYSTEM KEYBOARD

(75) Inventors: Daniel S. Carr, Round Rock, TX (US); Gilberto Hernandez, Mission, TX (US); Charles D. Hood, III, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 95 days.

(21) Appl. No.: 12/463,926

(22) Filed: May 11, 2009

(65) Prior Publication Data

US 2010/0284136 A1 Nov. 11, 2010

(51) Int. Cl.
*G06F 1/16* (2006.01)

(52) U.S. Cl. .................................. 361/679.09; 400/472

(58) Field of Classification Search ............. 361/679.09, 361/679.11; 400/472
See application file for complete search history.

(56) References Cited

U.S. PATENT DOCUMENTS

| 5,543,787 | A  | * | 8/1996  | Karidis et al. .................. 341/20 |
| 5,574,446 | A  |   | 11/1996 | Dittrich et al. |
| 5,734,548 | A  | * | 3/1998  | Park .......................... 361/679.14 |
| 5,768,094 | A  | * | 6/1998  | Merkel ...................... 361/679.13 |
| 6,239,390 | B1 |   | 5/2001  | Fukui et al. |
| 6,437,972 | B1 |   | 8/2002  | Sellers |
| 6,762,931 | B2 | * | 7/2004  | Chen ......................... 361/679.11 |
| 6,995,975 | B2 |   | 2/2006  | Hamada et al. |
| 7,102,878 | B2 | * | 9/2006  | Yu et al. .................... 361/679.09 |
| 7,176,393 | B1 | * | 2/2007  | Lin et al. ........................ 200/5 A |
| 7,450,370 | B2 | * | 11/2008 | Jiang et al. ............... 361/679.09 |
| 7,755,883 | B2 | * | 7/2010  | Hsu et al. ................. 361/679.17 |
| 2002/0126441 | A1 | * | 9/2002 | Kuo et al. ...................... 361/680 |
| 2006/0210340 | A1 | * | 9/2006 | Atzmon ........................ 400/472 |
| 2006/0274491 | A1 | * | 12/2006 | Wangchen .................... 361/683 |
| 2006/0274492 | A1 | * | 12/2006 | Roh ............................. 361/683 |

* cited by examiner

*Primary Examiner* — Lisa Lea-Edmonds
(74) *Attorney, Agent, or Firm* — Haynes and Boone, LLP

(57) ABSTRACT

A keyboard support system includes a chassis. A keyboard base is mounted to the chassis. A keyboard is coupled to the keyboard base. A tensioning device is coupled to the chassis and the keyboard base, and the tensioning device is adjustable to produce a tension in the keyboard base in order to reduce the deflection of the keyboard that occurs when keys on the keyboard are depressed.

20 Claims, 18 Drawing Sheets

INFORMATION HANDLING SYSTEM KEYBOARD

BACKGROUND

The present disclosure relates generally to information handling systems, and more particularly to a keyboard on an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

One aspect of an IHS such as, for example, a portable IHS, that has a significant effect on a user's perception of quality is the feel of the keyboard. As a user depresses a key, the force imparted on the key can cause the entire keyboard to deflect. If the deflection of the entire keyboard from the force used to depress the key passes a certain threshold, the users perception of quality is diminished. As portable IHSs become thinner, the distance a key is able to travel is reduced, and the mounting of the keyboard must be firm in order to address typing accuracy and the user perception issues discussed above. Furthermore, when a backlight is keyboards, those keyboards become even more flexible due to the significant perforations used to allow passage of light into each key.

One conventional solution to this problem includes adding additional layers of metal adjacent the backside of the keyboard to give the keyboard support. However, such solutions undesirably increase the system thickness and weight, and can interfere with other information handling system components such as, for example, optical disk drives, which are located adjacent the keyboard with only a small clearance between the keyboard and the optical disk drive. Other solutions includes providing a pre-bow on the keyboard base plate in addition to the backside support discussed above, using magnets behind the keyboard in combination with the backside support discussed above in order to reduce keyboard deflection by ensuring that the keyboard stays in contact with the backside support, and using a web of metal between the keys, all of which suffer from at least some of the deficiencies discussed above.

Accordingly, it would be desirable to provide an improved keyboard for an information handling system.

SUMMARY

According to one embodiment, a keyboard support system includes a chassis, a keyboard base mounted to the chassis, a keyboard coupled to the keyboard base, and a tensioning device connected to the chassis and the keyboard base, wherein the tensioning device is adjustable to produce a tension in the keyboard base.

BRIEF DESCRIPTION OF THE DRAWINGS

FIG. 2b is a bottom perspective view illustrating an embodiment of the chassis of FIG. 2a.

FIG. 5b is a perspective view illustrating an embodiment of the keyboard system of FIGS. 3a and 3b coupled to the tensioning device of FIG. 5a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
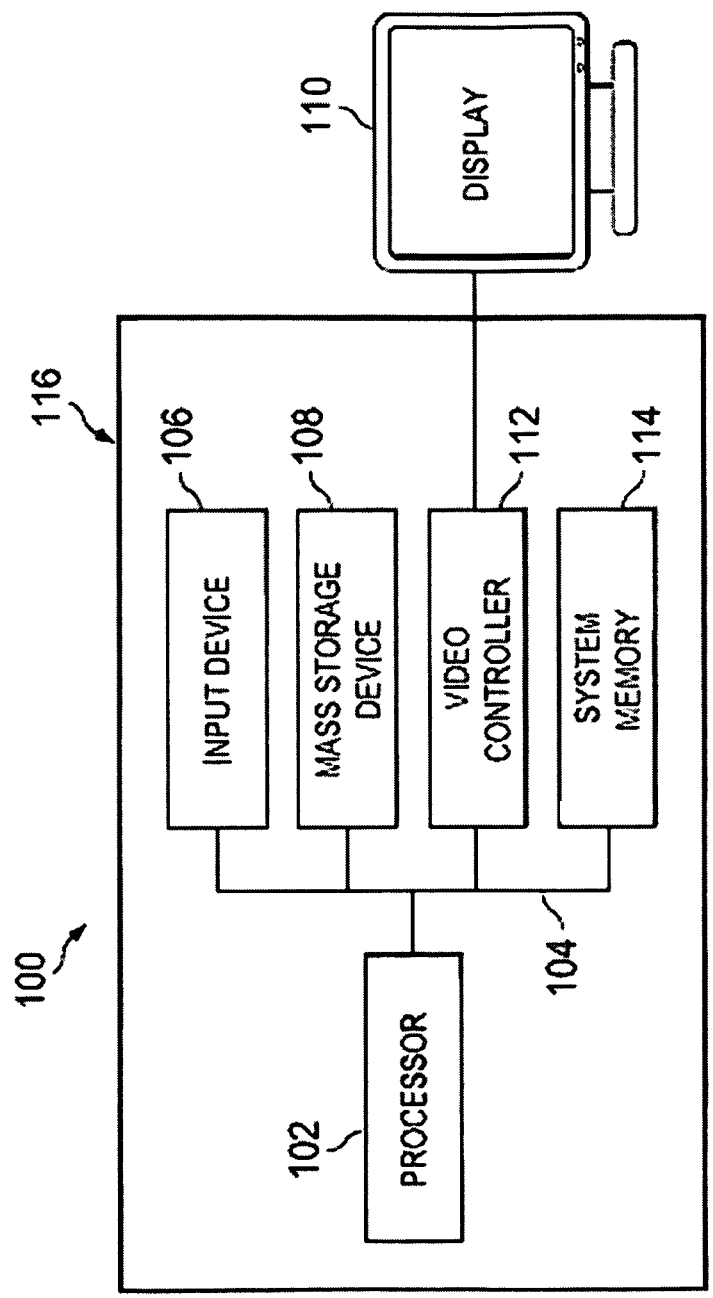
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
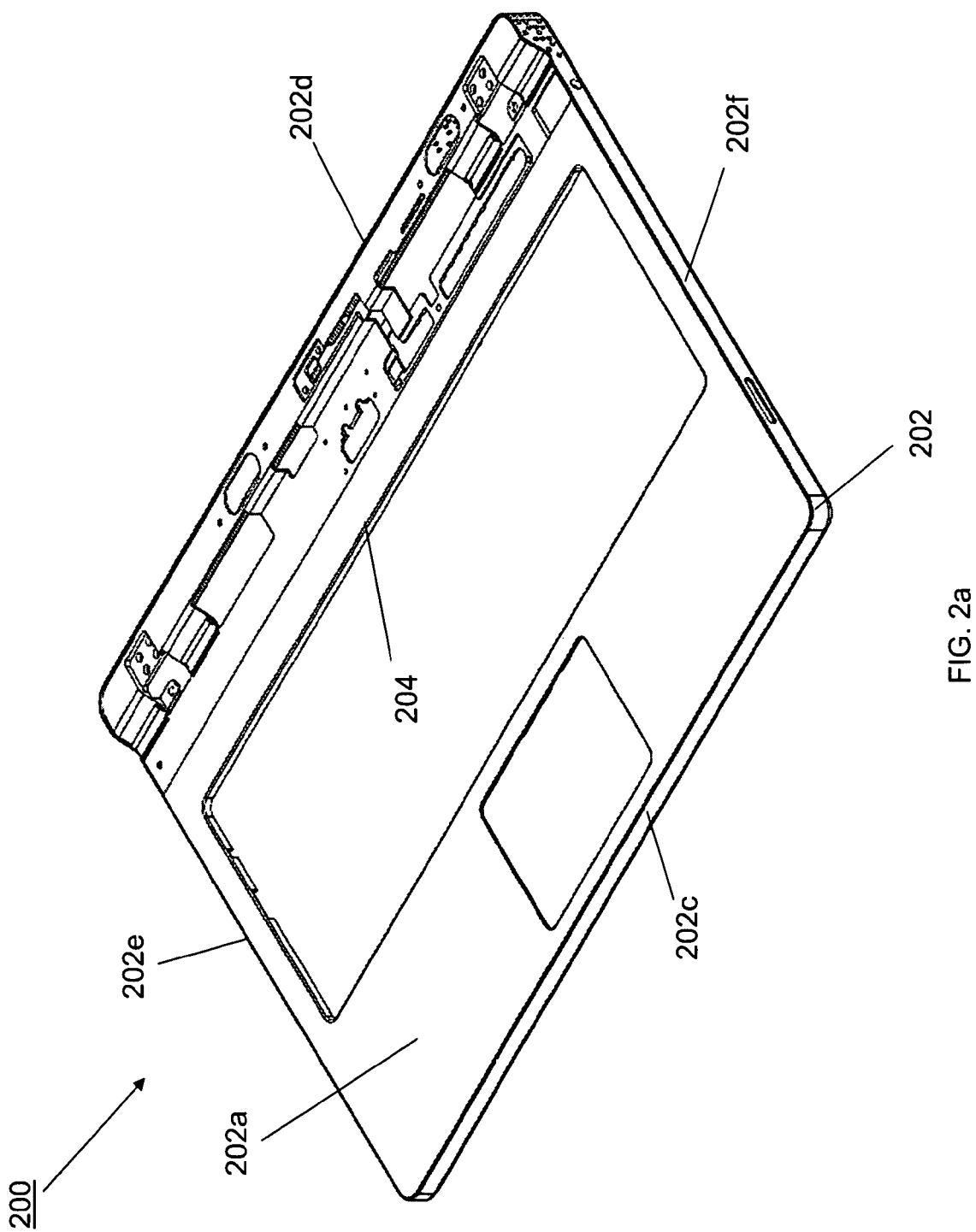
FIG. 2a is a top perspective view illustrating an embodiment of a chassis.
Figure 2B:
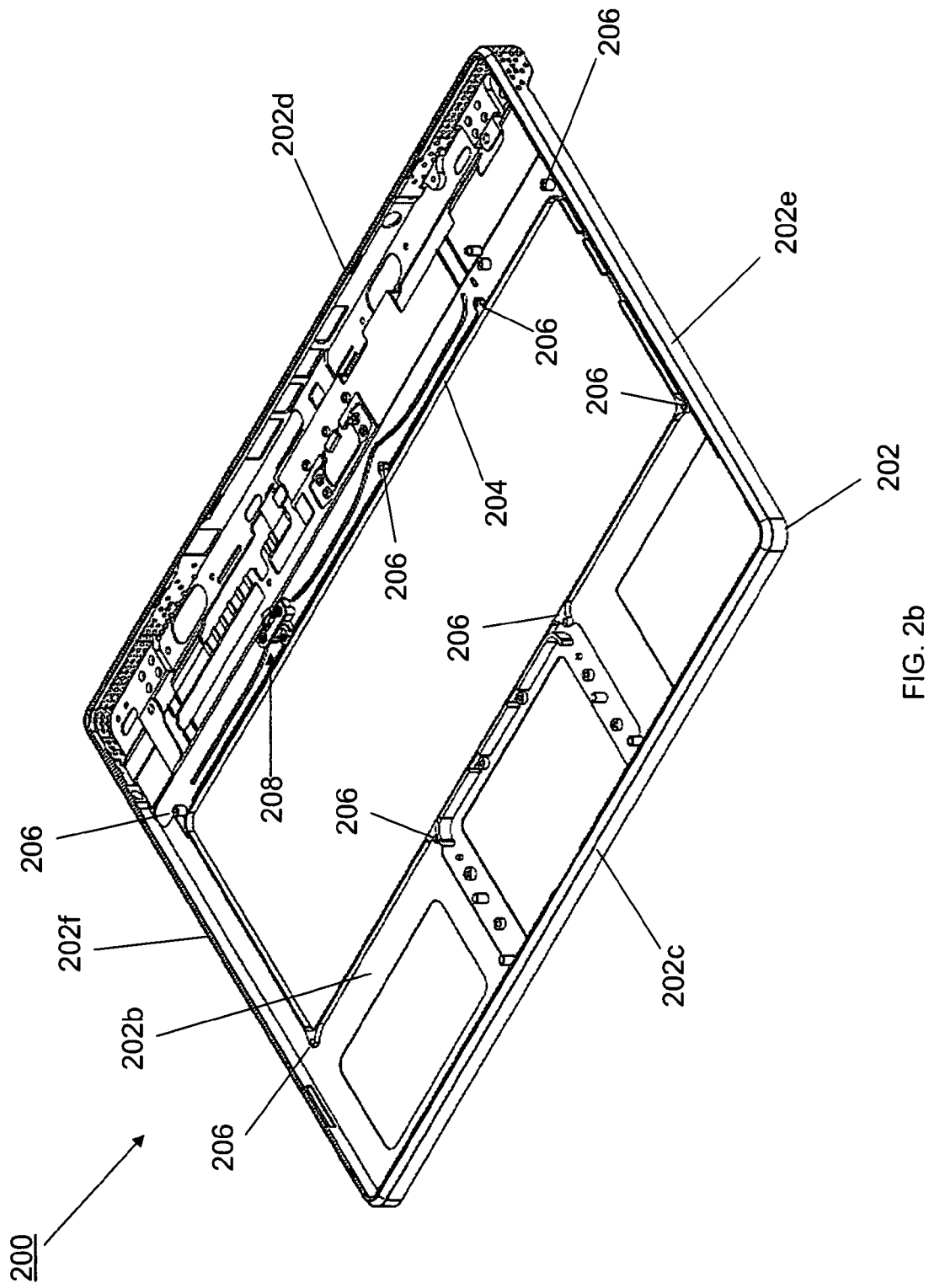
Figure 2C:
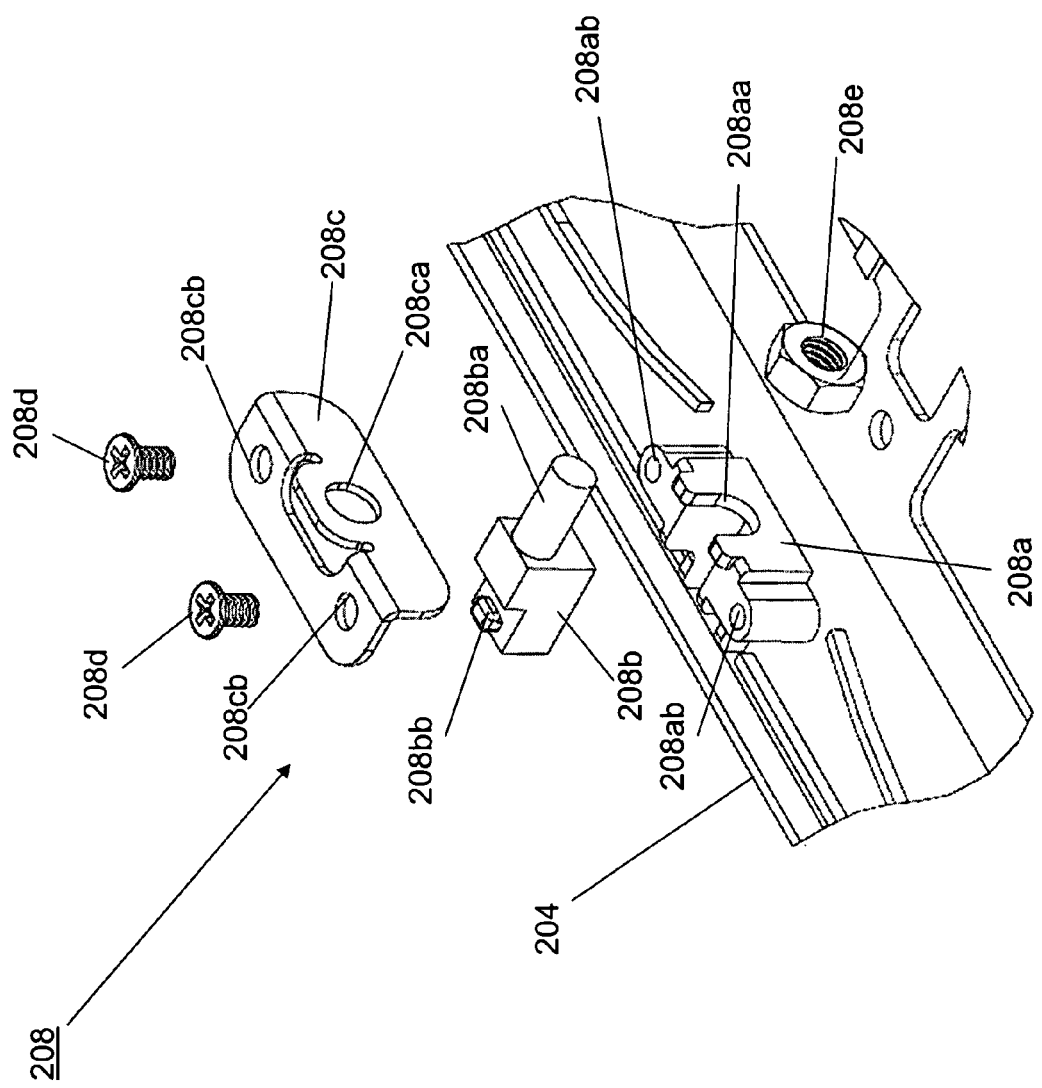
FIG. 2c is an exploded perspective view illustrating an embodiment of a tensioning device located on the chassis of FIGS. 2a and 2b.

Referring now to FIGS. 2a, 2b, and 2c, a chassis 200 is illustrated. In an embodiment, the chassis 200 may be part of the chassis 116, described with reference to FIG. 1. In an embodiment, the chassis 200 may be part of a portable IHS chassis. The chassis 200 includes a base 202 having a top surface 202a, a bottom surface 202b located opposite the top surface 202a, a front edge 202c extending between the top surface 202a and the bottom surface 202b, a rear edge 202d located opposite the front edge 202c and extending between the top surface 202a and the bottom surface 202b, and a pair of opposing side edges 202e and 202f extending between the top surface 202a, the bottom surface 202b, the front edge 202c, and the rear edge 202d. A keyboard opening 204 is defined by the base 202, centrally located on the base 202, and extends through the base 202 from the front surface 202a to the rear surface 202b. A plurality of keyboard base mounts 206 are located on the bottom surface 202b of the base 202 adjacent the keyboard opening 204 in a spaced apart relationship from each other. A tensioning device 208 is located on the bottom surface 202b of the base 202 adjacent keyboard opening 204. The tensioning device 208 includes a support member 208a that extends from the base 202 immediately adjacent the keyboard opening 204 and defines an adjustment member channel 208aa and a plurality of securing apertures 208ab. The tensioning device 208 also includes an adjustment member 208b having a first threaded member 208ba extending from one end of the adjustment member 208b and a keyboard base coupling member 208bb that extends from an end of the adjustment member 208b that is opposite the first threaded member 208ba. The tensioning device 208 also includes a securing bracket 208c that defines an adjustment member channel 208ca and a plurality of securing apertures 208cb. The tensioning device 208 also includes a pair of securing members 208d and a second threaded member 208e. The operation of the support member 208a, adjustment member 208b, securing bracket 208c, securing members 208d, and second threaded member 208e will be described in further detail below.

Figure 3A:
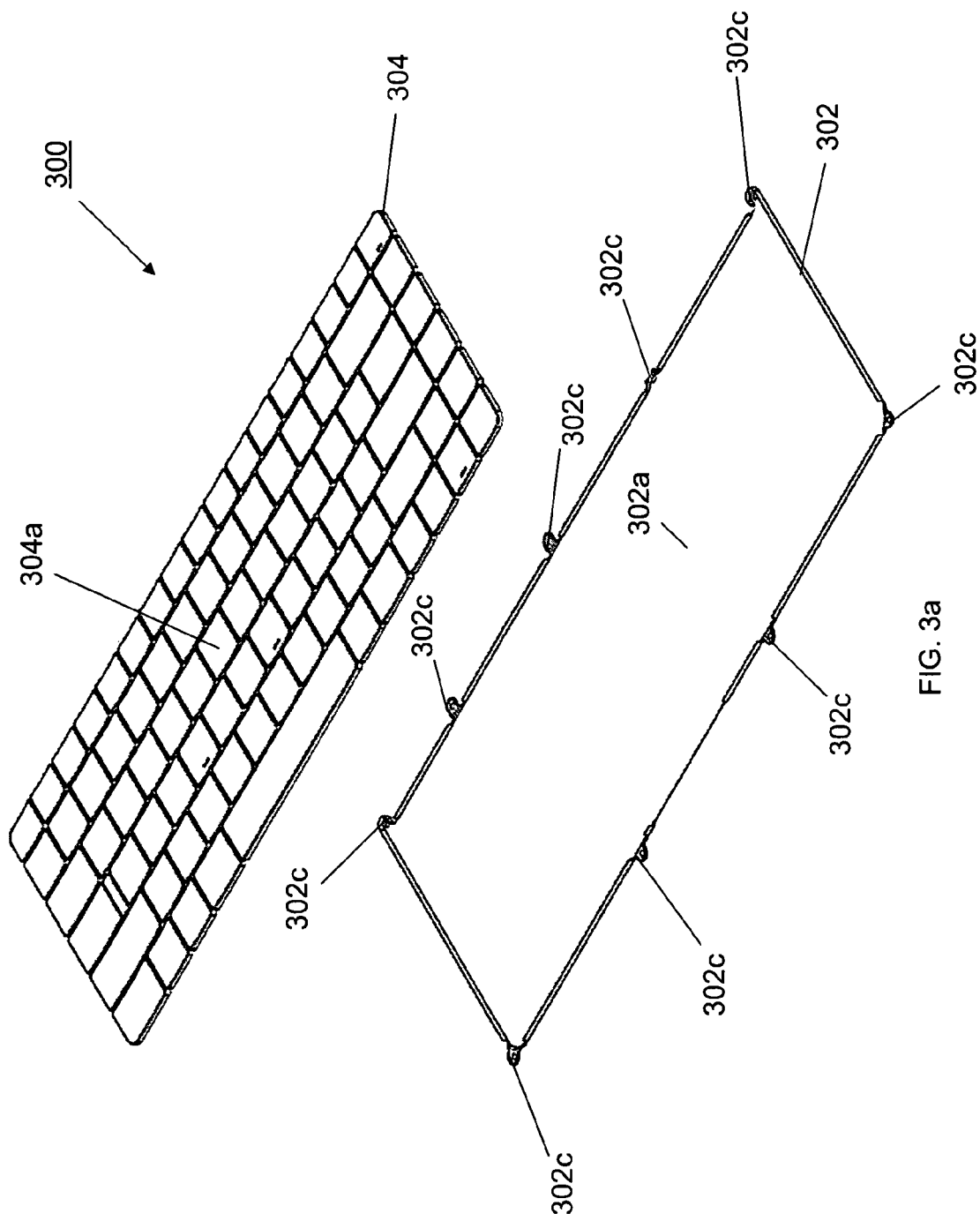
FIG. 3a is a top perspective view illustrating an embodiment of a keyboard system.
Figure 3B:
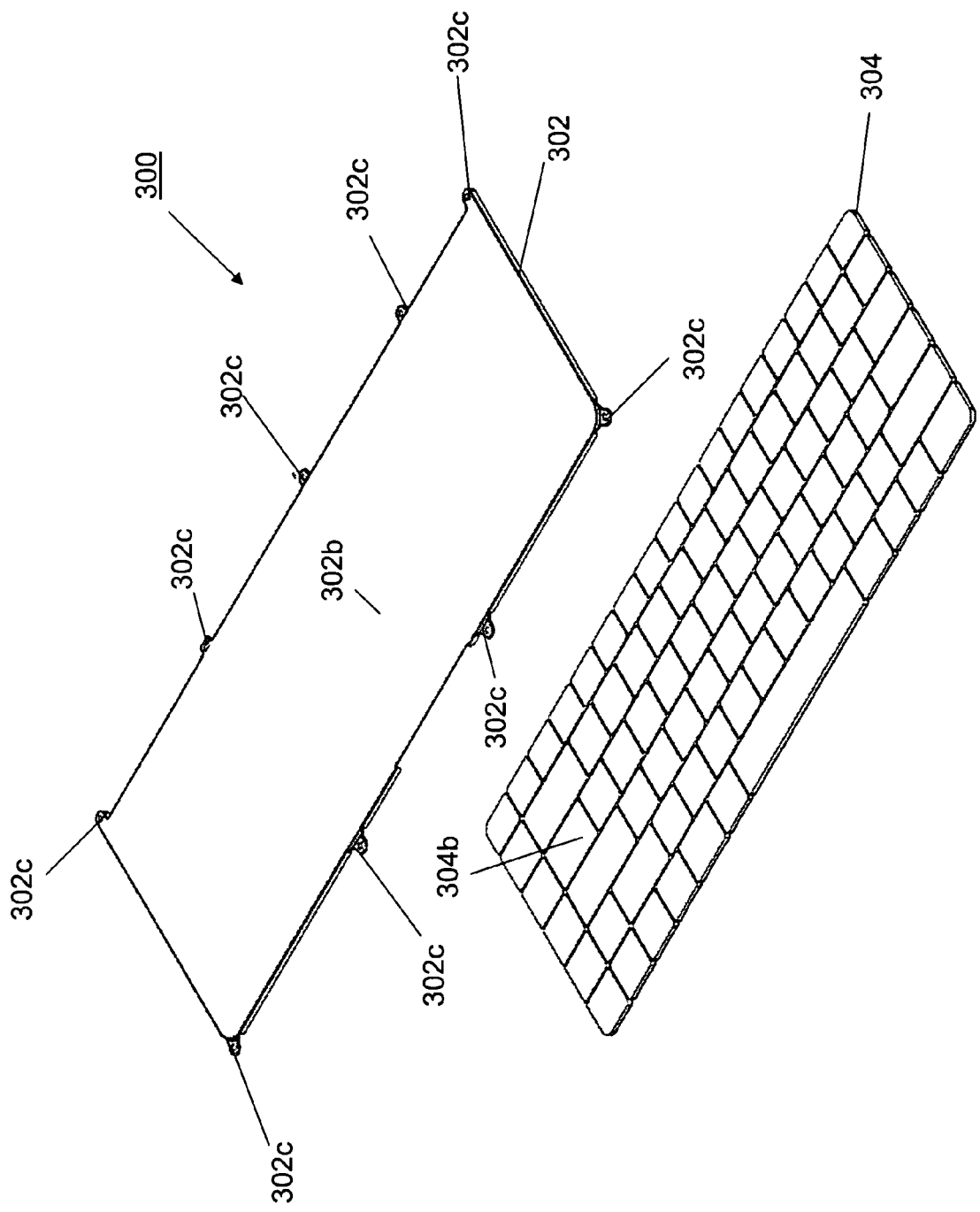
FIG. 3b is a bottom perspective view illustrating an embodiment of a keyboard system.

Referring now to FIGS. 3a and 3b, a keyboard system 300 is illustrated. The keyboard system 300 includes a keyboard base 302 having a top surface 302a and a bottom surface 302b located opposite the top surface 302a. A plurality of chassis mounts 302c are located adjacent the perimeter edge of the keyboard base 302 in a spaced apart relationship from each other. The keyboard system 300 also includes a keyboard 304 having a top surface 304a and a bottom surface 304b located opposite the top surface 304a. While the details of the keyboard 304 have not been illustrated for clarity of discussion, one of skill in the art will recognize that the keyboard 304 may include several layers that provide keys, electrical connections, electrical connectors, and/or a variety of other components that allow a user to provide input to an information handling system using the keyboard 304. In an embodiment, the keyboard 304 is a backlit keyboard that is operable have its keys illuminated.

Figure 4A:
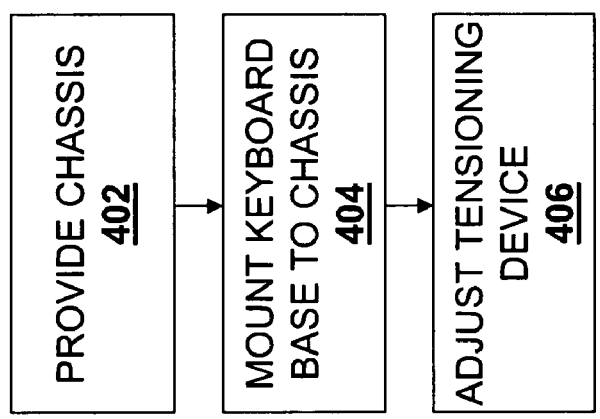
FIG. 4a is a flow chart illustrating an embodiment of a method for providing a keyboard on a chassis.
Figure 4B:
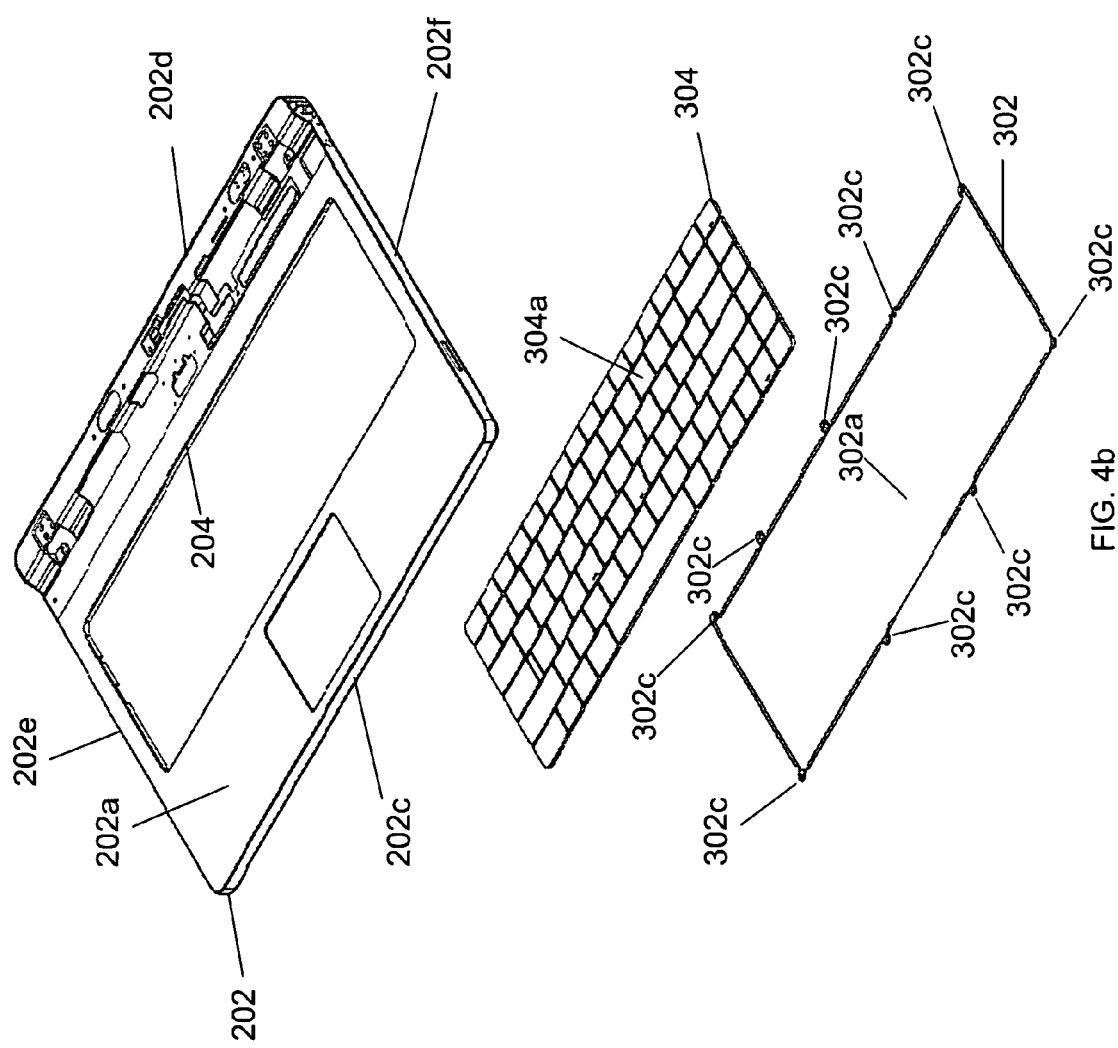
FIG. 4b is a top perspective view illustrating an embodiment of the keyboard system of FIGS. 3a and 3b being coupled to the chassis of FIGS. 2a and 2b.
Figure 4C:
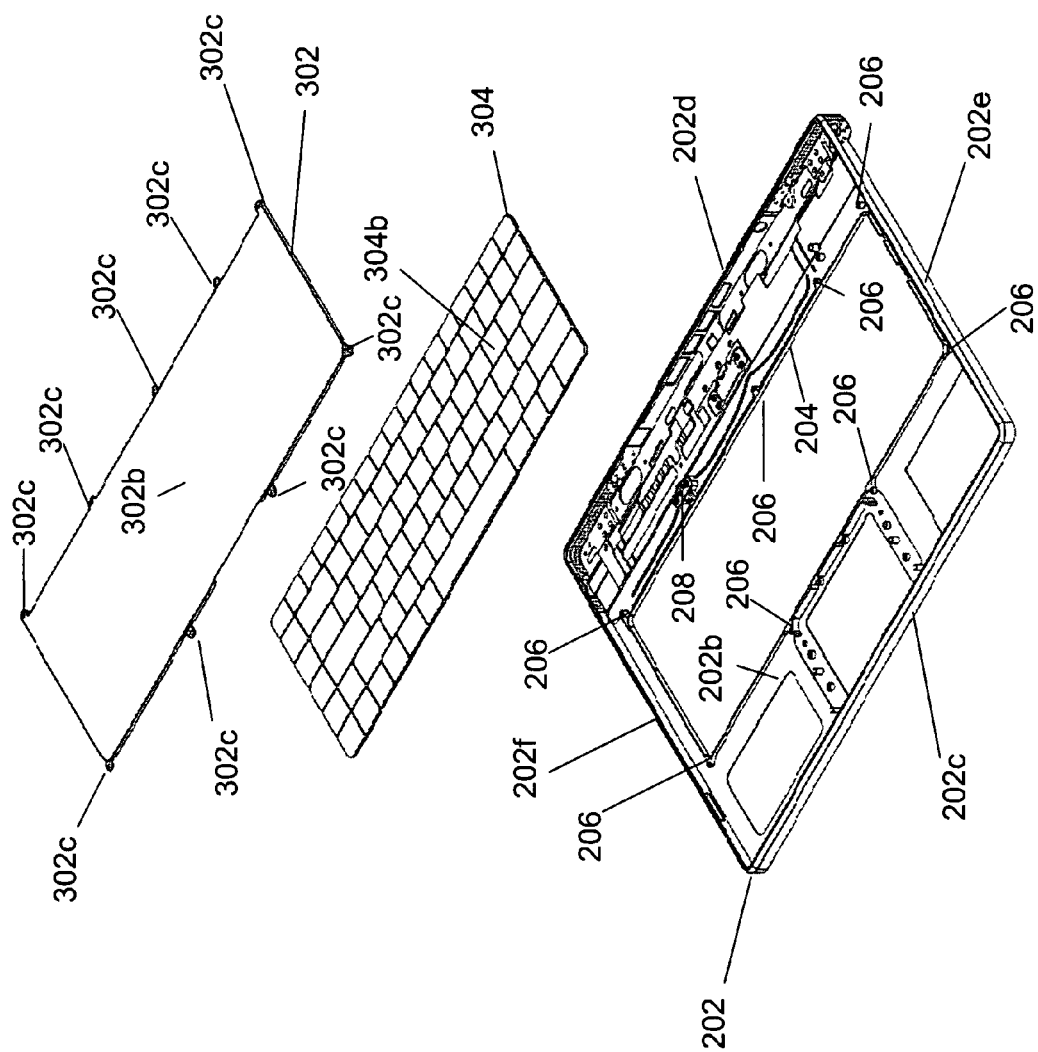
FIG. 4c is a bottom perspective view illustrating an embodiment of the keyboard system of FIGS. 3a and 3b being coupled to the chassis of FIGS. 2a and 2b.
Figure 4D:
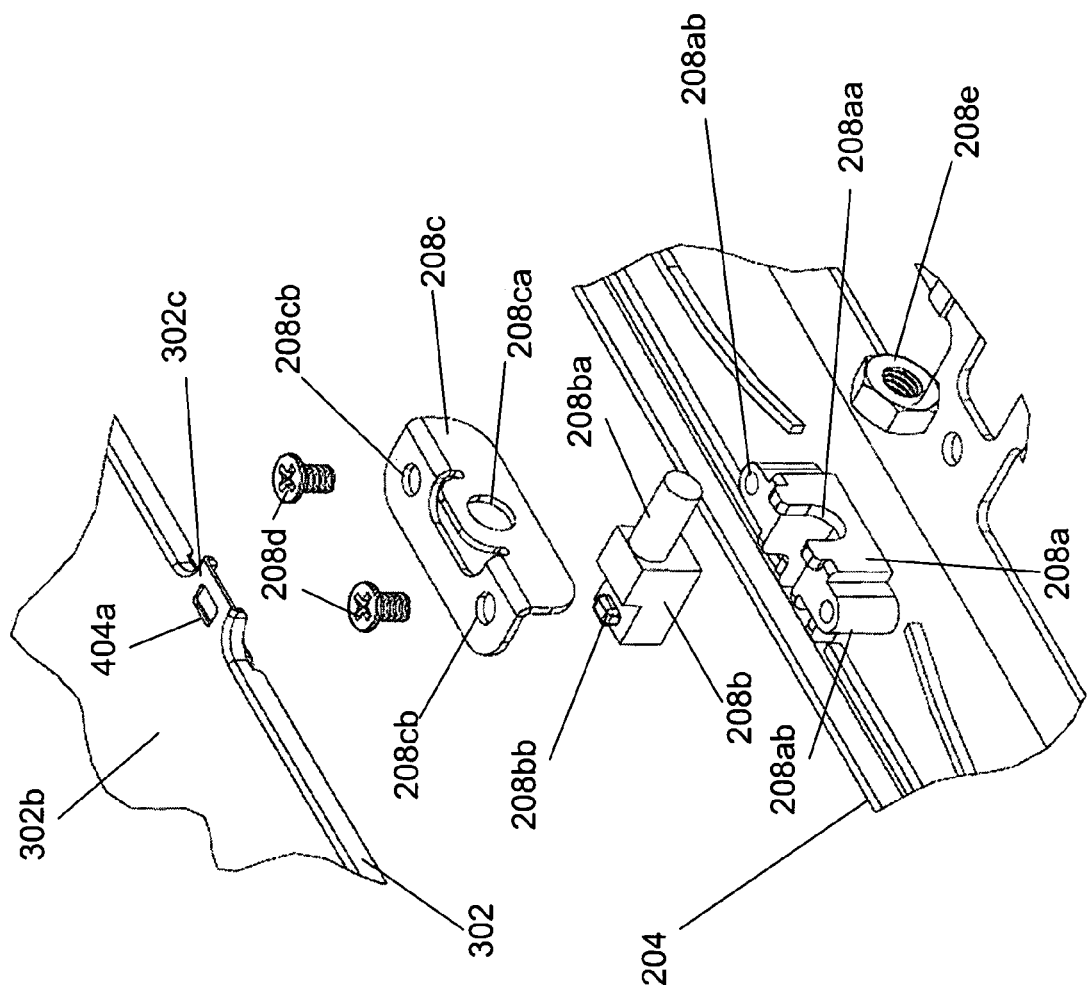
FIG. 4d is an exploded perspective view illustrating an embodiment of the keyboard system of FIGS. 3a and 3b being coupled to the tensioning device of FIG. 2c.
Figure 4E:
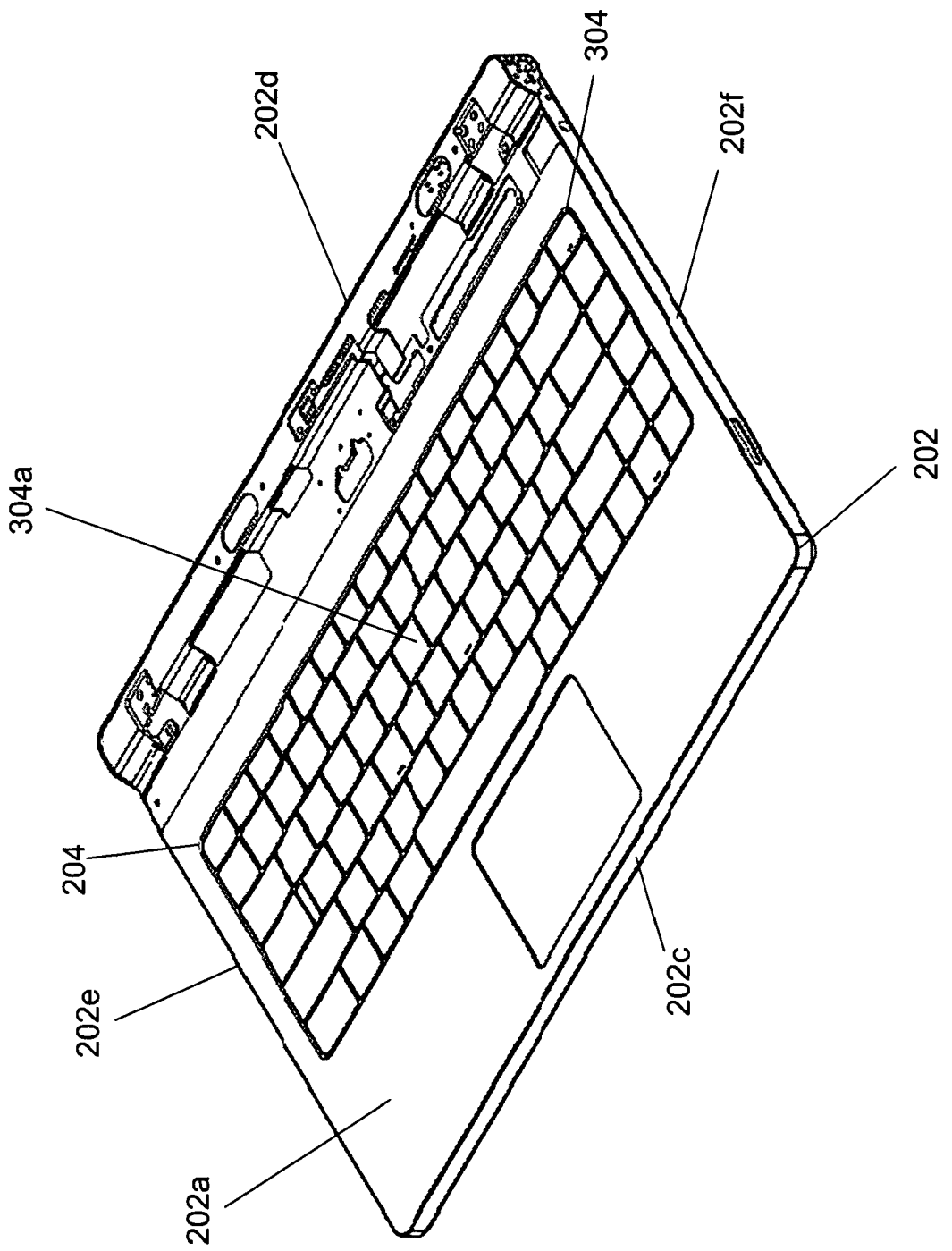
FIG. 4e is a top perspective view illustrating an embodiment of the keyboard system of FIGS. 3a and 3b coupled to the chassis of FIGS. 2a and 2b.
Figure 4F:
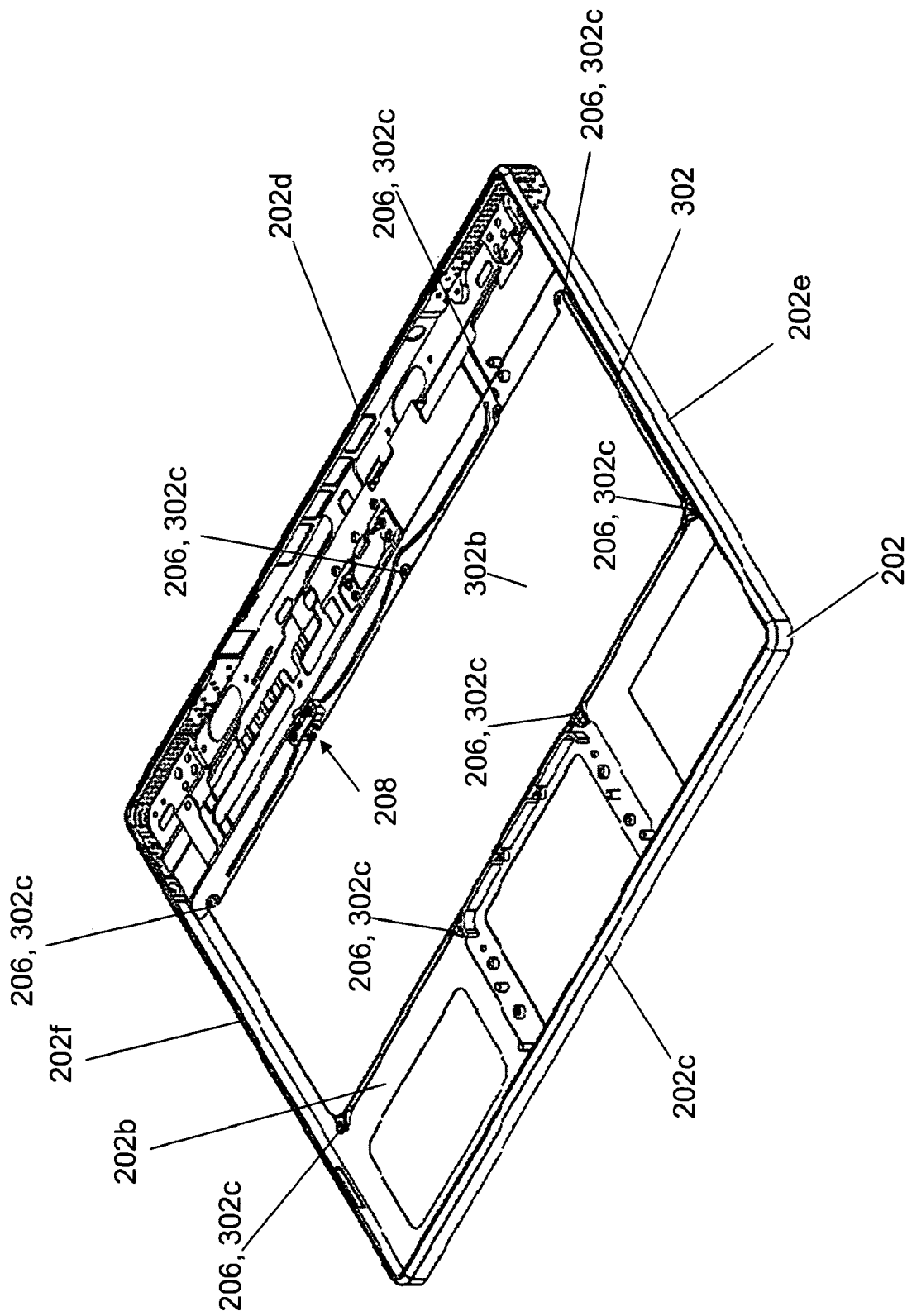
FIG. 4f is a bottom perspective view illustrating an embodiment of the keyboard system of FIGS. 3a and 3b coupled to the chassis of FIGS. 2a and 2b.

Referring now to FIGS. 2a, 2b, 2c, 3a, 3b, 4a, 4b, 4c, 4d, 4e, 4f, and 4g, a method 400 for providing a keyboard on a chassis is illustrated. The method 400 begins at block 402 where a chassis is provided. In an embodiment, the chassis 200 including the plurality of keyboard base mounts 206, described above with reference to FIGS. 2a, 2b, and 2c, is provided. The method 400 then proceeds to block 404 where a keyboard base is mounted to the chassis. The keyboard base 302 and the keyboard 304 are positioned adjacent the chassis 200 such that they are located adjacent the keyboard opening 204, with the top surface 304a of the keyboard 304 adjacent the bottom surface 202b of the chassis 200 and the top surface 302a of the keyboard base 302 adjacent the bottom surface 304b of the keyboard 304, as illustrated in FIGS. 4b and 4c. The keyboard base 302 and the keyboard 304 are then moved toward the chassis 200 such that the keyboard 304 becomes located in the keyboard opening 204, as illustrated in FIG. 4e, and the keyboard base 302 becomes located immediately adjacent the keyboard 304 with each of the chassis mounts 302c on the keyboard base 302 located adjacent a respective keyboard base mount 206 on the chassis 200, as illustrated in FIG. 4f. In an embodiment, the keyboard 304 may be coupled to IHS components such as, for example, the processor 102 and/or a variety of other IHS components known in the art. The keyboard base 302 is then mounted to the chassis 200 by securing a plurality of the chassis mounts 302c to respective keyboard base mounts 206 using, for example, screws, rivets, adhesives, and/or a variety of other securing methods known in the art, and coupling a chassis mount 302c to the tensioning device 208. In the illustrated embodiment, at least one of the chassis mounts 302c includes a coupling aperture 404a defined by the keyboard base 302, as illustrated in FIG. 4d.

Figure 4G:
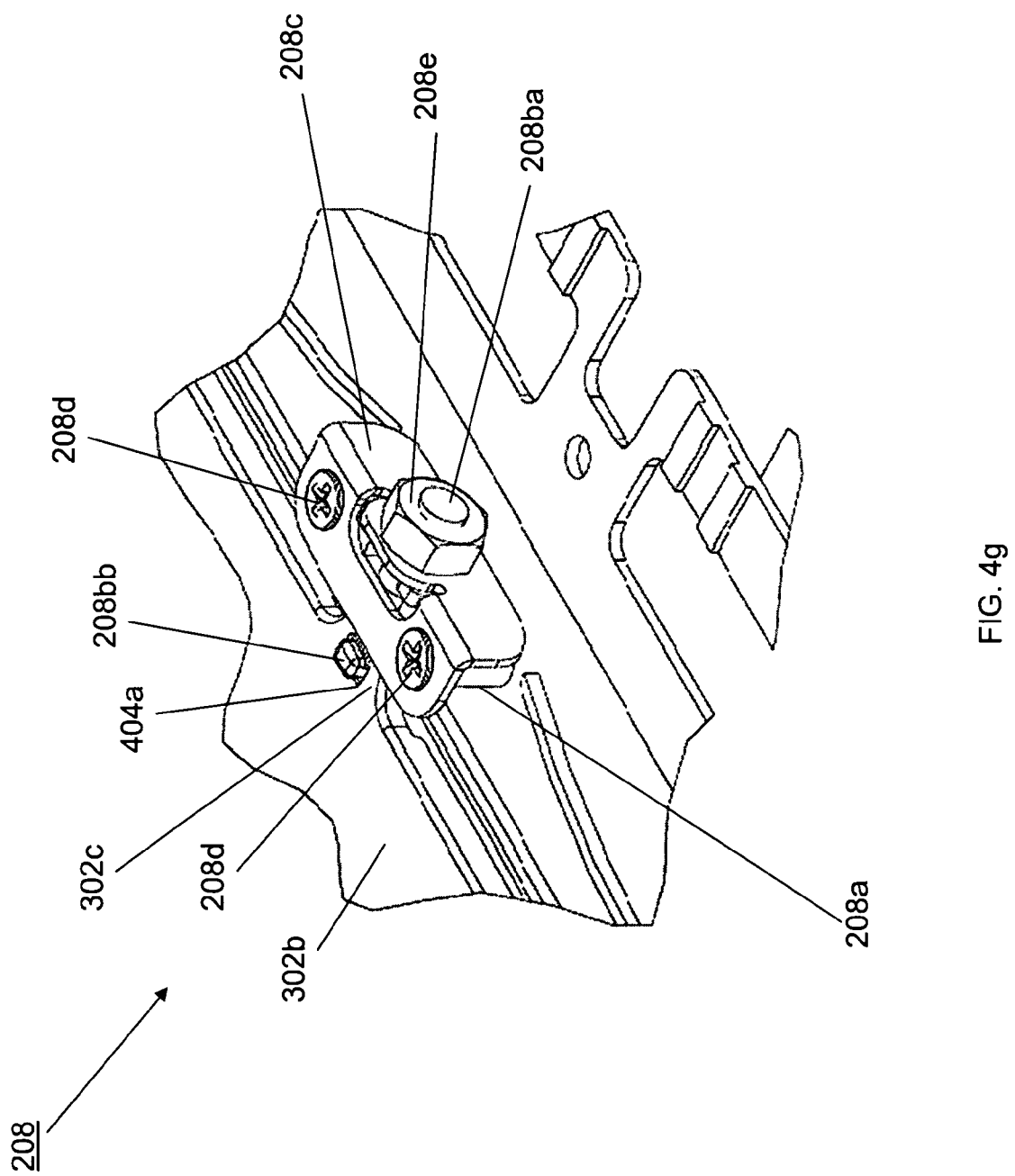
FIG. 4g is a perspective view illustrating an embodiment of the keyboard system of FIGS. 3a and 3b coupled to the tensioning device of FIG. 2c.

As illustrated in FIGS. 4d and 4g, in order to couple the chassis mount 302c to the tensioning device 208, the adjustment member 208b is engaged with the support member 208a such that the first threaded member 208ba is located in the adjustment member channel 208aa. The securing bracket 208c is then engaged with the support member 208a and the adjustment member 208b by positioning the first threaded member 208ba in the adjustment member channel 208ca and securing the securing bracket 208c to the support member 208a by positioning the securing members 208d in the securing apertures 208cb and 208ab on the securing bracket 208c and support member 208a, respectively. The keyboard base coupling member 208bb on the adjustment member 208b is then positioned in the coupling aperture 404a on the chassis mount 302c of the keyboard base 302 and the second threaded member 208e is threaded on to the first threaded member 208ba, as illustrated in FIG. 4g.

The method 400 then proceeds to block 406 where the tensioning device is adjusted. In the illustrated embodiment, the tensioning device 208 may be adjusted by rotating the second threaded member 208e in the appropriate direction relative to the first threaded member 208ba in order to move the adjustment member 208b away from the keyboard opening 204 due to the coupling of the second threaded member 208e and the first threaded member 208b, the engagement of the second threaded member 208e and the securing bracket 208c, and the engagement of the securing bracket and the support member 208a. Due to the engagement of the adjustment member 208b and the keyboard base 302 (through the positioning of the keyboard base coupling member 208bb in the coupling aperture 404a on the chassis mount 302c) and the mounting of the keyboard base 302 to the chassis 200 (through the securing of the plurality of the chassis mounts 302c to respective keyboard base mounts 206,) moving the adjustment member 208b away from the keyboard opening 204 produces a tension in the keyboard base 302, as the adjustment member 308b/keyboard base 302 coupling will apply a force to the keyboard base 302 that pulls the keyboard base 302 away from at least one of the keyboard base mounts 206 to which the keyboard base 302 is mounted. This tension can be adjusted (e.g., increased or decreased) by rotating the second threaded member 208e in an appropriate direction relative to the first threaded member 208ba. By producing a tension in the keyboard base 302, the support provided by the keyboard base 302 to the keyboard 304 is stiffened, and when a user depresses a key on the keyboard 304, the deflection of the keyboard 304 and keyboard base 302 combination will be less than if there were no tension provided in the keyboard base 302. Thus, a system and method are provided for providing a keyboard on a chassis that reduces the deflection of the keyboard without substantially increasing the systems thickness and weight relative to conventional solutions, and without interfering with other components in the system.

Figure 5A:
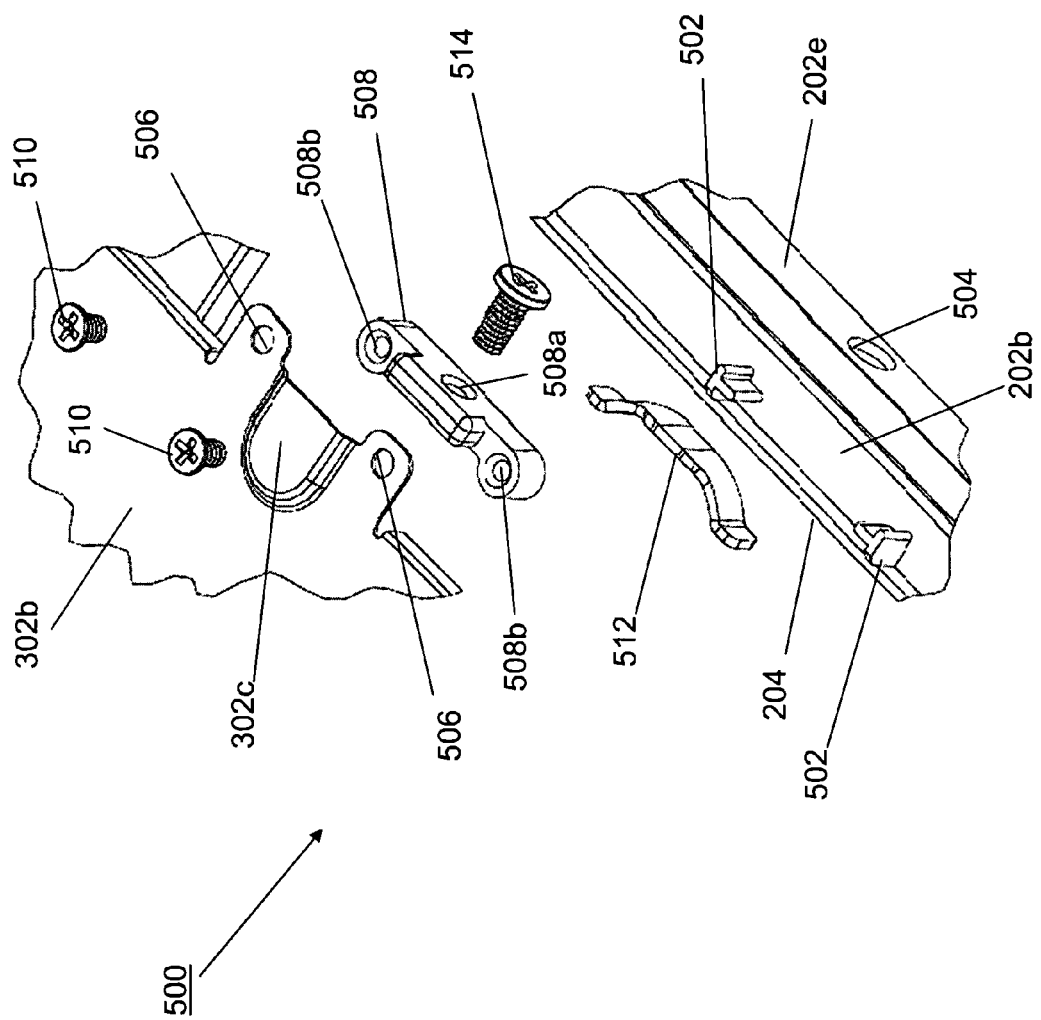
FIG. 5a is an exploded perspective view illustrating an embodiment of the keyboard system of FIGS. 3a and 3b being coupled to an alternative embodiment of a tensioning device.
Figure 5B:
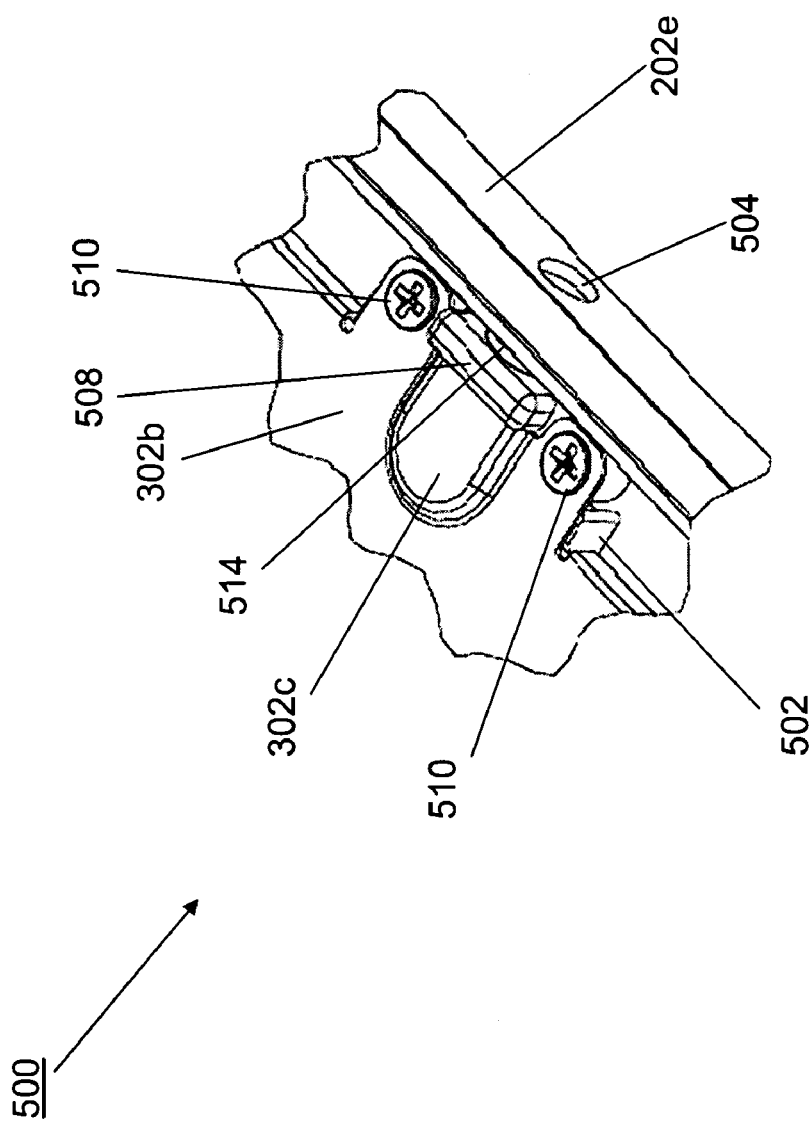

Referring now to FIGS. 5a and 5b, an embodiment of a tensioning device 500 is illustrated that may replace the tensioning device 208 described above. As part of the tensioning device 500, the chassis 200, described above with reference to FIGS. 2a and 2b, further includes a plurality of support members 502 that extend in a spaced apart orientation from each other on the bottom surface 202b of the chassis 200 adjacent the keyboard opening 204, and defines an aperture 504 that extends through the side wall 202e of the chassis 200. The chassis mount 302c of the keyboard base 302 defines a plurality of securing apertures 506. An adjustment member 508 defines a first threaded member 508a and a plurality of securing apertures 508b, and is coupled to the chassis mount 302c on the keyboard base 302 by positioning a plurality of securing members 510 in the securing apertures 506 and 508b on the chassis mount 302c and adjustment member 508, respectively. A leaf spring 512 is then positioned adjacent the bottom surface 202b of the chassis 202 and in engagement with the support members 502, and the chassis mount 302c on the keyboard base 302 is positioned such that the adjustment member 508 is located adjacent the leaf spring 512. A second threaded member 514 is then positioned such that it engages both the first threaded member 508a and the leaf spring 512, as illustrated in FIG. 5b. At block 406 of the method 400, the tensioning device 500 may be adjusted by rotating the second threaded member 514 in the appropriate direction relative to the first threaded member 508a in order to move the adjustment member 508 away from the keyboard opening 204 due to the coupling of the second threaded member 514 and the first threaded member 508a and the engagement of the second threaded member 514 and the leaf spring 512. Due to the engagement of the adjustment member 508 and the keyboard base 302 and the mounting of the keyboard base 302 to the chassis 200, moving the adjustment member 508 away from the keyboard opening 204 produces a tension in the keyboard base 302, as the adjustment member 508/keyboard base 302 coupling will apply a force to the keyboard base 302 that pulls the keyboard base 302 away from at least one of the keyboard base mounts 206 to which the keyboard base 302 is mounted. This tension can be adjusted (e.g., increased or decreased) by rotating the second threaded member 514 in an appropriate direction relative to the first threaded member 508a. As can be seen in FIG. 5b, the second threaded member 514 can be accessed from the outside of the chassis 200 through the aperture 504, allowing the stiffness of the keyboard to be adjusted without disassembling the IHS chassis. Furthermore, the leaf spring 512 compensates for dimensional variation in the associated parts of the tensioning device 500 so that controlled torque is not required for consistent tensile force. In an embodiment, the leaf spring may be deflected a fixed amount during the assembly of the system.

Figure 6A:
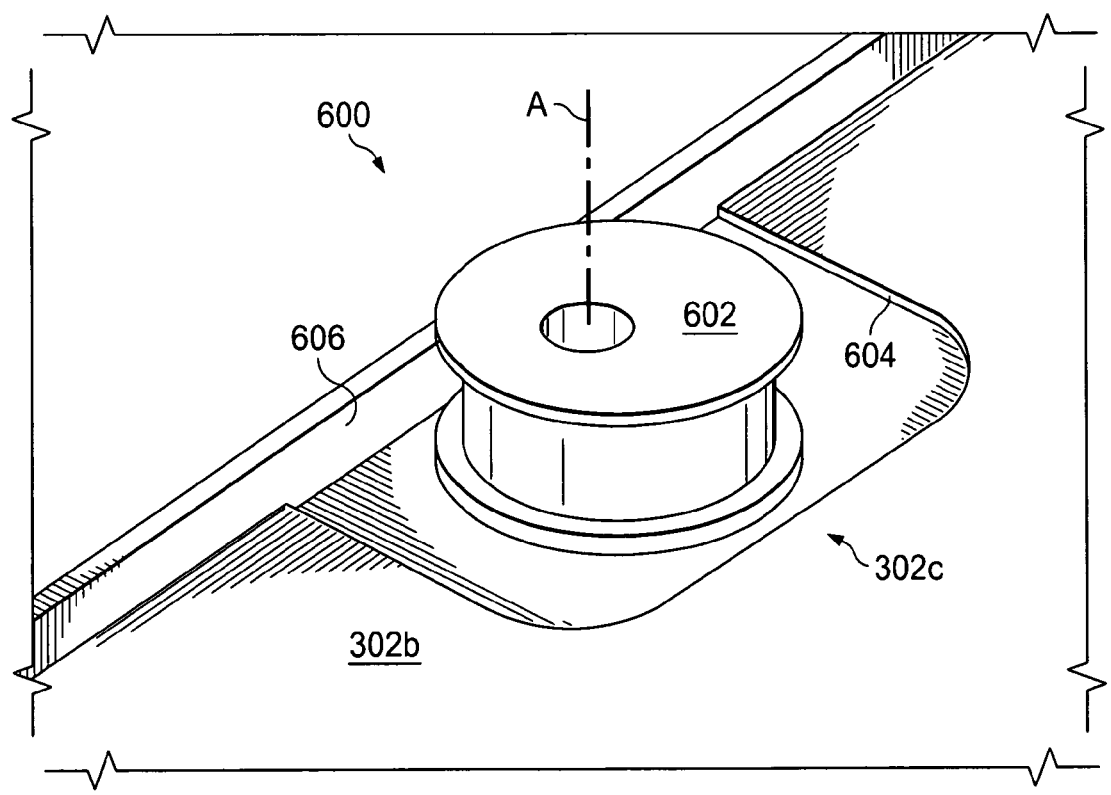
FIG. 6a is a perspective view illustrating an embodiment of the keyboard system of FIGS. 3a and 3b coupled to an alternative embodiment of a tensioning device.
Figure 6B:
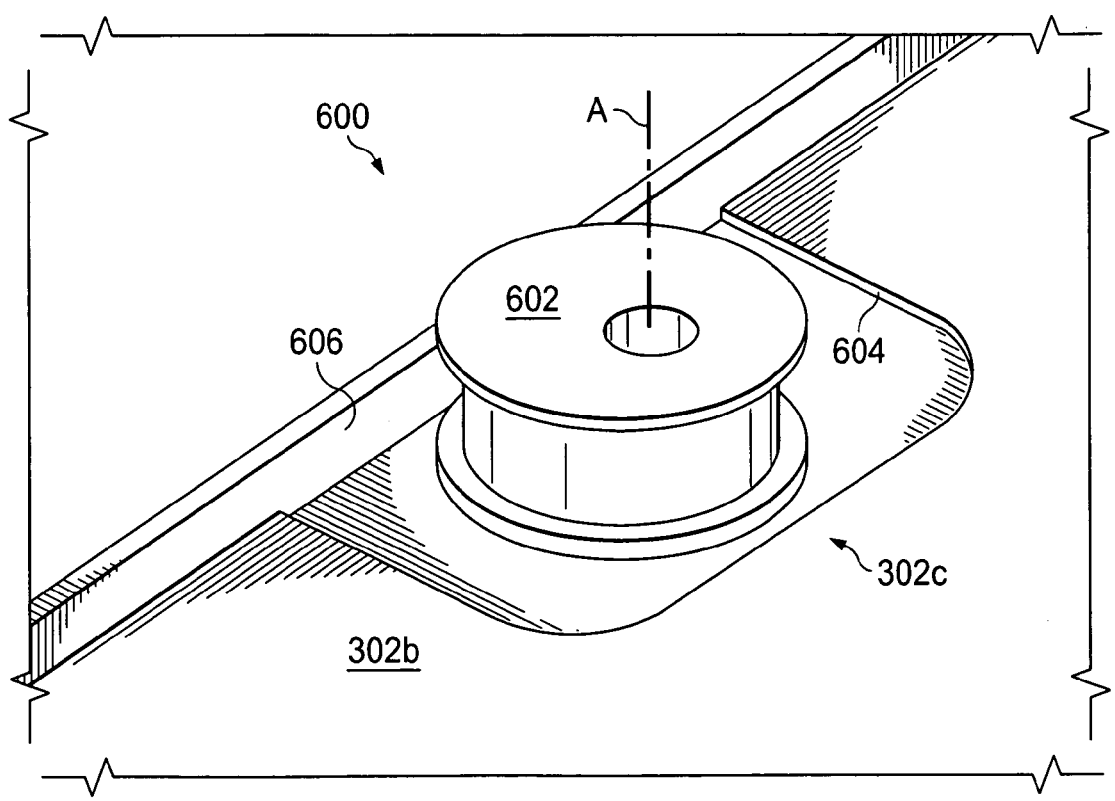
FIG. 6b is a perspective view illustrating an embodiment of the tensioning device of FIG. 6a providing a tension in the keyboard system of FIGS. 3a and 3b.

Referring now to FIGS. 6a and 6b, an embodiment of a tensioning device 600 is illustrated that may replace the tensioning devices 208 and 500 described above. As part of the tensioning device 600, the chassis 200, described above with reference to FIGS. 2a and 2b, further includes a cam 602 that is moveably coupled to the bottom surface 202b adjacent the keyboard opening 204 such that the cam 602 may rotate about an axis A. The chassis mount 302c of the keyboard base 302 defines a cam channel 604 and includes an adjustment member 606 located adjacent the cam channel 604. When the keyboard base 302 is coupled to the chassis 200, the cam 602 is positioned in the cam channel 604 and adjacent the adjustment member 606. In an embodiment, the cam 602 may maintain contact with the adjustment member 606 throughout its range of rotation about the axis A. In an embodiment, the cam 602 may need to be rotated about the axis A to engage the adjustment member 606. At block 406 of the method 400, the tensioning device 600 may be adjusted by rotating the cam 602 about the axis A, as illustrated in FIG. 6b. Due to the eccentric shape of the cam 602, rotation of the cam 602 moves the adjustment member 606 away from the keyboard opening 204, thereby producing a tension in the keyboard base 302, as the cam 602 will apply a force to the adjustment member 606 that is transmitted to the keyboard base 302 and pulls the keyboard base 302 away from at least one of the keyboard base mounts 206 to which the keyboard base 302 is mounted. This tension can be adjusted (e.g., increased or decreased) by rotating the cam 602 in an appropriate direction about the axis A.

Figure 7:
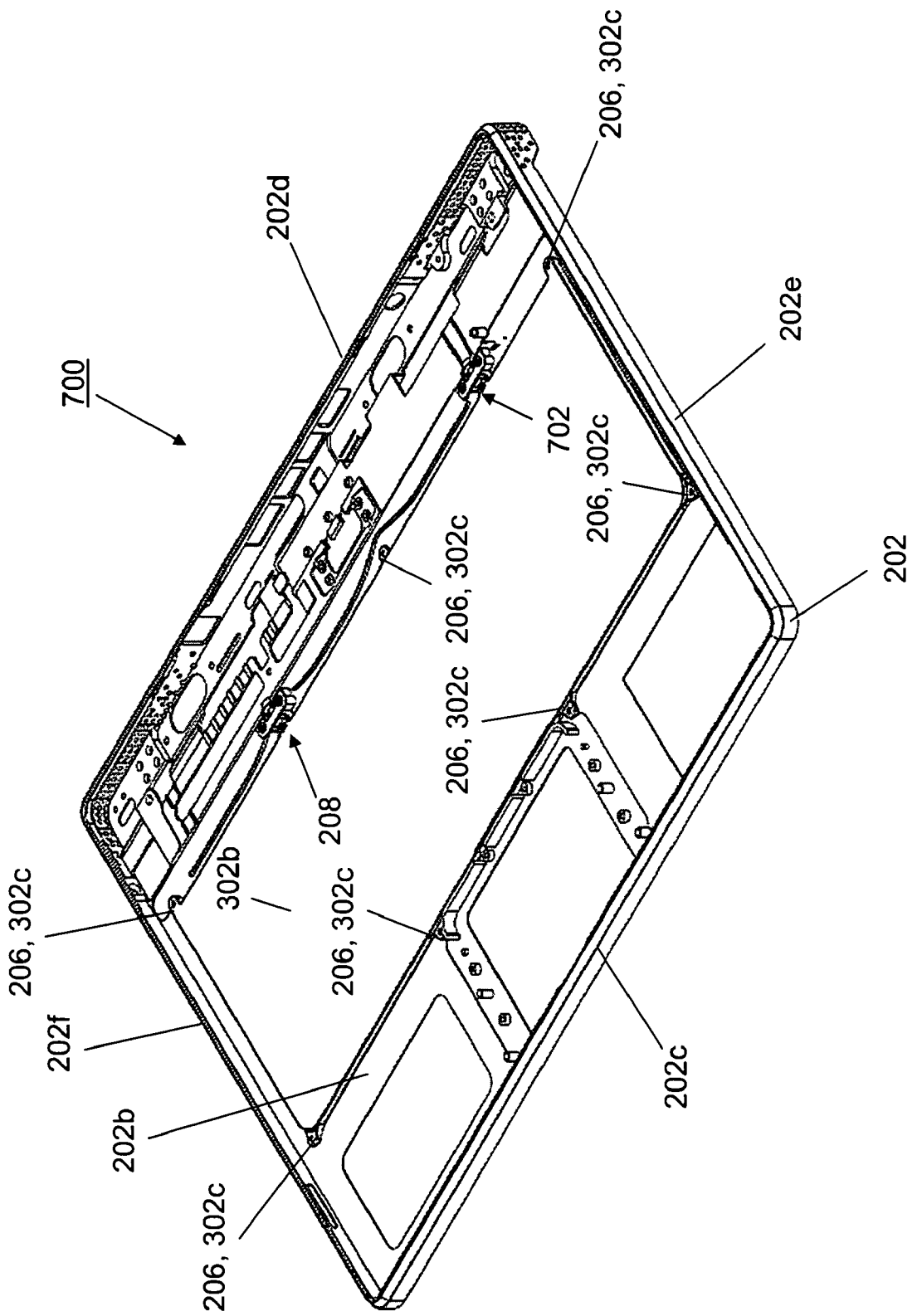
FIG. 7 is a bottom perspective view illustrating an embodiment of the chassis of FIGS. 2a and 2b having a plurality of tensioning devices.

Referring now to FIG. 7, an alternative embodiment of a keyboard support system 700 is illustrated that is substantially similar in structure and operation to the keyboard support systems described above, but with the provision of an additional tensioning device 702, which may be the tensioning devices 208, 500, and/or 600, described above. Furthermore, one of skill in the art will recognize that the locations of the tension devices 208 and 702 may be moved from those illustrated in FIG. 7 without departing from the scope of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A keyboard support system, comprising:
   a chassis;
   a keyboard base mounted to the chassis;
   a keyboard coupled to the keyboard base; and
   a tensioning device coupled to the chassis and the keyboard base, wherein the tensioning device is adjustable to produce a tension in the keyboard base.

2. The system of claim 1, wherein the tensioning device comprises at least one threaded member that is rotatable to produce the tension in the keyboard base.

3. The system of claim 2, wherein the at least one threaded member is accessible through an aperture defined by the chassis.

4. The system of claim 1, wherein the tensioning device comprises a cam.

5. The system of claim 1, wherein the keyboard comprises a backlit keyboard.

6. The system of claim 1, wherein a plurality of tensioning devices are coupled to the chassis and the keyboard base and are adjustable to produce a tension in the keyboard base.

7. The system of claim 1, wherein the chassis defines a keyboard opening and comprises a plurality of keyboard base mounts located adjacent the keyboard opening.

8. The system of claim 1, wherein the tensioning device comprises a leaf spring.

9. An information handling system, comprising:
   a portable information handling system chassis;
   a processor located in the information handling system chassis;
   a keyboard base mounted to the chassis;
   a keyboard coupled to the keyboard base and the processor; and
   a tensioning device coupled to the chassis and the keyboard base, wherein the tensioning device is adjustable to produce a tension in the keyboard base.

10. The system of claim 9, wherein the tensioning device comprises at least one threaded member that is rotatable to produce the tension in the keyboard base.

11. The system of claim 10, wherein the at least one threaded member is accessible through an aperture defined by the chassis.

12. The system of claim 9, wherein the tensioning device comprises a cam.

13. The system of claim 9, wherein the keyboard comprises a backlit keyboard.

14. The system of claim 9, wherein a plurality of tensioning devices are coupled to the chassis and the keyboard base and are adjustable to produce a tension in the keyboard base.

15. The system of claim 9, where the chassis defines a keyboard opening and comprises a plurality of keyboard base mounts located adjacent the keyboard opening.

16. The system of claim 9, wherein the tensioning device comprises a leaf spring.

17. A method for providing a keyboard on a chassis, comprising:
   providing a chassis comprising a plurality of keyboard base mounts;
   mounting a keyboard base to the plurality of keyboard base mounts; and
   adjusting a tensioning device that is connected to the chassis and the keyboard base in order to produce a tension in the keyboard base.

18. The method of claim 17, wherein the adjusting the tensioning device comprises applying a force to the keyboard base that pulls the keyboard base away from at least one of the keyboard base mounts to which the keyboard base is mounted.

19. The method of claim 17, wherein the adjusting the tensioning device comprises rotating a threaded member.

20. The method of claim 17, wherein the adjusting the tensioning device comprises rotating a cam.

* * * * *